(12) United States Patent
Maruyama

(10) Patent No.: US 8,704,466 B2
(45) Date of Patent: Apr. 22, 2014

(54) METHOD FOR DRIVE-CONTROLLING ELECTRIC MACHINERY

(75) Inventor: Nobuchika Maruyama, Nagano (JP)

(73) Assignee: Shinano Kenshi Kabushiki Kaisha, Ueda-shi (JP)

(*) Notice: Subject to any disclaimer, the term of this patent is extended or adjusted under 35 U.S.C. 154(b) by 424 days.

(21) Appl. No.: 13/153,663

(22) Filed: Jun. 6, 2011

(65) Prior Publication Data

US 2011/0316455 A1 Dec. 29, 2011

(30) Foreign Application Priority Data

Jun. 28, 2010 (JP) ................................. 2010-146543

(51) Int. Cl.
*H02P 3/00* (2006.01)

(52) U.S. Cl.
USPC .......................................... 318/362; 318/366

(58) Field of Classification Search
USPC ......................................... 318/362, 364, 366
See application file for complete search history.

(56) References Cited

U.S. PATENT DOCUMENTS

| | | | | |
|---|---|---|---|---|
| 6,005,358 | A * | 12/1999 | Radev | 318/139 |
| 6,199,670 | B1 * | 3/2001 | Shirai et al. | 188/158 |
| 6,275,763 | B1 * | 8/2001 | Lotito et al. | 701/71 |
| 6,337,729 | B1 * | 1/2002 | Morii | 349/155 |
| 8,447,479 | B2 * | 5/2013 | Umemoto et al. | 701/51 |

FOREIGN PATENT DOCUMENTS

| | | |
|---|---|---|
| CN | 101511615 A | 8/2009 |
| JP | 11-215687 A | 8/1999 |
| JP | 2001-287660 A | 10/2001 |
| JP | 2005-247078 A | 9/2005 |
| JP | 2006-238560 A | 9/2006 |
| JP | 2009-220807 A | 10/2009 |

OTHER PUBLICATIONS

Chinese Office Action dated Sep. 3, 2013, issued in corresponding Chinese Patent Application No. 201110190846.2, w/ English translation.

* cited by examiner

*Primary Examiner* — Rina Duda
(74) *Attorney, Agent, or Firm* — Westerman, Hattori, Daniels & Adrian, LLP

(57) ABSTRACT

The method is capable of equalizing time lengths of stopping a motor at load-holding stop positions of respective phases so as to average amounts of heat generation of phase coils. The method for drive-controlling electric machinery, in which a multiphase motor is used as a driving source of an assist mechanism, is performed by a control unit including a driving circuit for driving the multiphase motor. The method is characterized in that the control unit controls to stop a rotor at a load-holding stop position, at which rotation of the rotor is stopped in a state where a motor coil is energized and the rotor is in a load-holding state, and that the load-holding stop position is angularly shifted an electric angle of 180/n (n is number of phases and an integer two or more) degrees, in a prescribed rotational direction, with respect to a previous load-holding stop position of the rotor.

4 Claims, 9 Drawing Sheets

FIG.3

EXAMPLE OF LOAD-HOLDING STOP ACTIONS

| ELECTRIC ANGLE | NUMBER OF LOAD-HOLDING STOP ACTIONS | | | | | | TOTAL NUMBER |
|---|---|---|---|---|---|---|---|
| | 1 | 2 | 3 | 4 | 5 | 6 | |
| (1) | 1 | | | 1 | | | 2 |
| (2) | | 1 | | | 1 | | 2 |
| (3) | | | 1 | | | 1 | 2 |

NUMBER OF STOPPING ROTOR OPERATION IN LOAD-HOLDING STATE

FIG.5

NUMBER OF STOPPING ROTOR OPERATION IN LOAD-HOLDING STATE

| ELECTRIC ANGLE | NUMBER OF STOPPING ROTOR OPERATION | | | | | TOTAL NUMBER |
|---|---|---|---|---|---|---|
| | 1 | 2 | 3 | 4 | 5 | |
| (1) | 2 | | | | | 2 |
| (2) | | 1 | | 1 | | 2 |
| (3) | | | 1 | | 1 | 2 |

NUMBER OF STOPPING ROTOR OPERATION IN LOAD-HOLDING STATE

| | NUMBER OF STOPPING ROTOR OPERATION | | | | | | TOTAL NUMBER |
|---|---|---|---|---|---|---|---|
| | 1 | 2 | 3 | 4 | 5 | 6 | |
| ELECTRIC ANGLE(1) | 1 | 1 | 1 | 1 | 1 | 1 | 6 |

METHOD FOR DRIVE-CONTROLLING ELECTRIC MACHINERY

CROSS-REFERENCE TO RELATED APPLICATION

This application is based upon and claims the benefit of priority of the prior Japanese Patent Application No. P2010-146543, filed on Jun. 28, 2010, and the entire contents of which are incorporated herein by reference.

FIELD

The present invention relates to a method for drive-controlling electric machinery.

BACKGROUND

Electric machinery includes a rotor and a stator. The stator has a stator core, in which motor coils are wound on teeth sections with insulators.

For example, in a vehicle, motors are used for actuating a clutch, an accelerator, etc. A rotary motion of the motor is converted into a linear motion, according to a load, so as to transmit the linear motion.

For example, a clutch mechanism, in which an electric motor is driven, according to an amount of pressing a clutch pedal, so as to actuate an assist member to connect or disconnect clutch plates, a brake mechanism, in which an electric motor is driven, according to an amount of pressing a brake pedal, so as to actuate an assist member to apply liquid pressure of brake oil to a master cylinder, etc. have been developed.

In the above described clutch mechanism or brake mechanism, a three-phase electric motor is often stopped and maintained in a load-holding state where the pedal is pressed and the motor coils are energized. In this state, electric current passing through the coil of one phase will be excessively increased. To solve this problem, one temperature sensor, e.g., thermistor, is provided to the electric motor to measure temperature increase of the electric motor, and temperatures of the phase coils are estimated by calculation. In case that temperature of one of the phase coils is higher than a predetermined temperature, a rotational position of the motor is moved to decrease a current value (absolute value) of the phase, through which the maximum current passes, from a peak value. For example, in case that a great current passes through the W-phase in a state of stopping the motor, the motor is rotated until the current value of the current passing through the W-phase reaches that of the current passing through the V-phase, which is smaller than the peak value of the W-phase, and a current value of the U-phase reaches zero, so that temperature increase of the W-phase coil can be restrained (see Japanese Laid-open Patent Publication No. 2009-220807).

In the above described conventional motor-driven mechanism, if the motor is stopped so as to hold a load, there is a high possibility that temperatures of the phase coils are different. Therefore, a span of life of the mechanism must be shortened due to heat deterioration. Since the temperatures of the coils are detected on the basis of thermal conductive properties of the coils rather than the temperature sensor provided to a motor housing, detection errors will easily occur due to unstable heat conductive properties. Further, the temperatures of the phase coils are estimated on the basis of the temperature detected by the temperature sensor and calculation, so a complex control must be required to perform the calculation process and a parts cost of the temperature sensor must be increased.

SUMMARY

Accordingly, it is objects to provide a method for drive-controlling electric machinery so as to solve the above described problems of the conventional technology. Namely, the method of the present invention is capable of equalizing time lengths of stopping a motor at load-holding stop positions of respective phases so as to average amounts of heat generation of phase coils.

To achieve the objects, the present invention has following structures.

Namely, the method for drive-controlling electric machinery, in which a multiphase motor is used as a driving source of an assist mechanism, is performed by a control unit including a driving circuit for driving the multiphase motor, the method is characterized in, that the control unit controls to stop a rotor at a load-holding stop position, at which rotation of the rotor is stopped in a state where a motor coil is energized and the rotor is in a load-holding state, and that the load-holding stop position is angularly shifted an electric angle of 180/n (n is number of phases and an integer two or more) degrees, in a prescribed rotational direction, with respect to a previous load-holding stop position of the rotor.

Preferably, one cycle of rotation of the rotor is defined as rotating the rotor from a given load-holding stop position and stopping the rotor at the given load-holding stop position after the rotor is rotated a prescribed angle, and a total time length of energizing the coil of each phase, while performing one cycle or a plurality of cycles of rotation of the rotor, is constant.

Preferably, the load-holding stop position is a stop position of the rotor corresponding to a specific electric angle at which maximum electric current passes through the coil of any of phases.

Preferably, the control unit controls the driving circuit on the basis of the position of the rotor, which is detected by a rotary sensor, with respect to a previous stop position of the motor, which is detected by a position sensor, so as to stop the motor at a position angularly shifted a prescribed angle with respect to the previous stop position.

In the present invention, the rotor is stopped at the load-holding stop position angularly shifted the electric angle of 180/n (n is number of phases and an integer two or more) degrees, in the prescribed rotational direction, with respect to the previous load-holding stop position of the rotor. One cycle of rotation of the rotor is defined as rotating the rotor from the given load-holding stop position and stopping the rotor at the given load-holding stop position after the rotor is rotated the prescribed angle, and the total time length of energizing the coil of each phase, while performing one cycle or a plurality of cycles of rotation of the rotor, is made equal at the load-holding stop position. With the above described control, increasing temperature of the coil of the specific phase can be prevented with the simple structure including no temperature sensor. Temperatures of the motor coils can be controlled without temperature sensors, so the system can be simplified and the control process can be simplified. Further, bad influences caused by unstable heat conductive properties can be prevented due to no temperature sensors, so the control is not influenced by use environment.

BRIEF DESCRIPTION OF THE DRAWINGS

Embodiments of the present invention will now be described by way of examples and with reference to the accompanying drawings, in which:

FIG. 3 is a table showing number of load-holding stop actions of the electric machinery, in a load-holding state, at each electric angle;

FIG. 5 is a table showing number of load-holding stop actions of another electric machinery, in the load-holding state, at each electric angle;

DETAILED DESCRIPTION OF THE EMBODIMENTS

Preferred embodiments of the present invention will now be described in detail with reference to the accompanying drawings. In the following embodiments, an in-vehicle three-phase DC brushless motor will be explained as an example of electric machinery.

Figure 1:
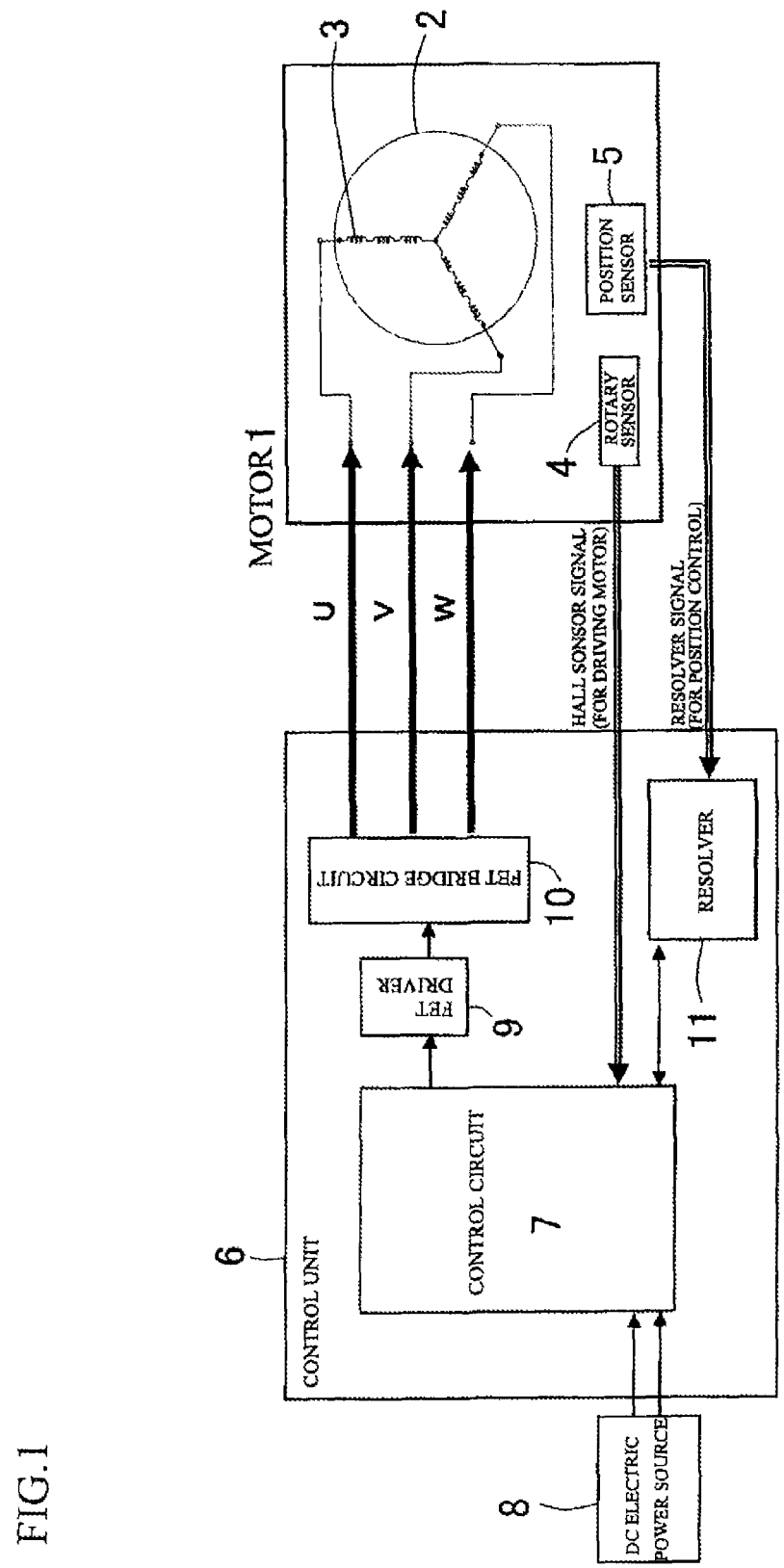
FIG. 1 is a block diagram of a control system of electric machinery.

Firstly, a control system of the electric motor will be explained with reference to FIG. 1.

The electric motor 1 generates power for assisting to press a clutch pedal. The electric motor 1 is rotated in a normal direction or a reverse direction according to a press action or a return action of the clutch pedal. A rotary motion of the electric motor 1 is converted into a linear motion by a ball bearing screw of an assist mechanism, so that clutch plates can be connected and disconnected. If the electric motor 1 is driven while pressing the clutch pedal (in a load-holding stop state), there is a possibility that maximum current passes through motor coils 3 of a specific phase and the coils are heat-damaged.

A rotor magnet (not shown) is provided to a rotor 2. The rotor 2 is integrated with a rotor shaft (not shown) and rotated together therewith. The rotor magnet is provided to a middle part of the rotor shaft, and both sides of the rotor magnet are rotatably held by ball bearings (not shown).

The motor coils 3 of three phases (U-phase, V-phase and W-phase) are wound on a stator core (not shown) facing the rotor magnet. A control unit (in-vehicle ECU) 6 makes motor current pass through the motor coils 3 of each of the phases at prescribed timing. In the present embodiment, the motor coils 3 are Y-connected. Note that, the connection pattern of the motor coils 3 is not limited to the Y-connection, they may be, for example, delta-connected.

Positions of magnetic poles of the rotor magnet are detected by a rotary sensor (hall sensor) 4, so that rotational positions of the rotor 2 can be detected. Further, absolute displacement of the movable clutch plate, with respect to a body of the vehicle, is detected, by a position sensor (resolver) 5, from rotational displacement of the electric motor 1.

The rotary sensor 4 and the position sensor 5 are connected to the control unit 6. The control unit 6 further includes a control circuit 7, which is constituted by various elements, e.g., CPU, ROM, RAM, so as to drive-control the electric motor 1. DC voltage is applied to the control circuit 7 from a DC electric power source 8, e.g., battery, to actuate the control circuit 7.

Detection signals of the rotary sensor 4 are sent to the control circuit 7. The control circuit 7 makes the motor current pass through the motor coils 3 of any two phases, according to the rotational position of the rotor 2, via a FET driver 9 and a FET bridge circuit 10, so as to activate the rotation of the rotor 2.

A resolver LSI 11 detects a rotational angle of the stopped electric motor 1 according to a detection signal of the position sensor 5. The control circuit 7 controls the rotational position of the rotor 2 to correspond to a prescribed position, with respect to the rotational angular position detected by the resolver LSI 11, via the FET driver 9 and the FET bridge circuit 10, as a standard position.

For example, when the rotation of the rotor 2 is stopped in the load-holding state and the motor coils 3 of each phase of the three-phase motor 1 are energized, the current supplied to the motor coils 3 of each phase is controlled so as to angularly turn or rotate the rotor 2 an electric angle of 180/n (n is number of phases and an integer two or more) degrees, e.g., 60 degrees, in a prescribed rotational direction, with respect to a previous stop position of the rotor 2.

By the way, in the present invention, one cycle of rotor operation (rotation) is defines as rotating the rotor 2 from a given load-holding stop position and stopping the rotor 2 at the given load-holding stop position after the rotor 2 is rotated a prescribed angle. The control circuit 7 makes a total time length of stopping the rotor 2 at each of the load-holding stop positions, while performing one cycle of the rotor operation, constant. Further, the total time length of stopping the rotor 2 at each of the load-holding stop positions, while performing a plurality of cycles of the rotor operation, may be constant.

An amount of heat generation Q of each of the coils 3 is obtained by the following formula:

$$Q = 0.24 \times I^2 \times R \times t$$

wherein R is a resistance value, I is a current value and t is a time length of energizing the coil.

As described above, if the total time length t of energizing each of the phase coils 3 at each of the load-holding stop positions, while performing one cycle or a plurality of cycles of the rotor operation, is constant, the currents passing through the phase coils 3 of the U-, V- and W-phases are sequentially maximized and the heat generations Q are averaged. Therefore, a standard position is not required. In case of the three-phase motor 1, the heat generations Q can be averaged when a variable electric angle is 60×N (N is an integer except multiples of three) degrees.

Note that, in case that the variable electric angle is 60×3N (N is an integer) degrees, a direction of the current passing through each of the phases is changed, but the rotor 2 is stopped in a state where the current having the same current value passes. Therefore, the heat generations Q of the motor coils 3 in the specific phase increases.

Next, patterns of energizing the motor coils 3 will be explained with reference to FIGS. 2-6.

Figure 2:
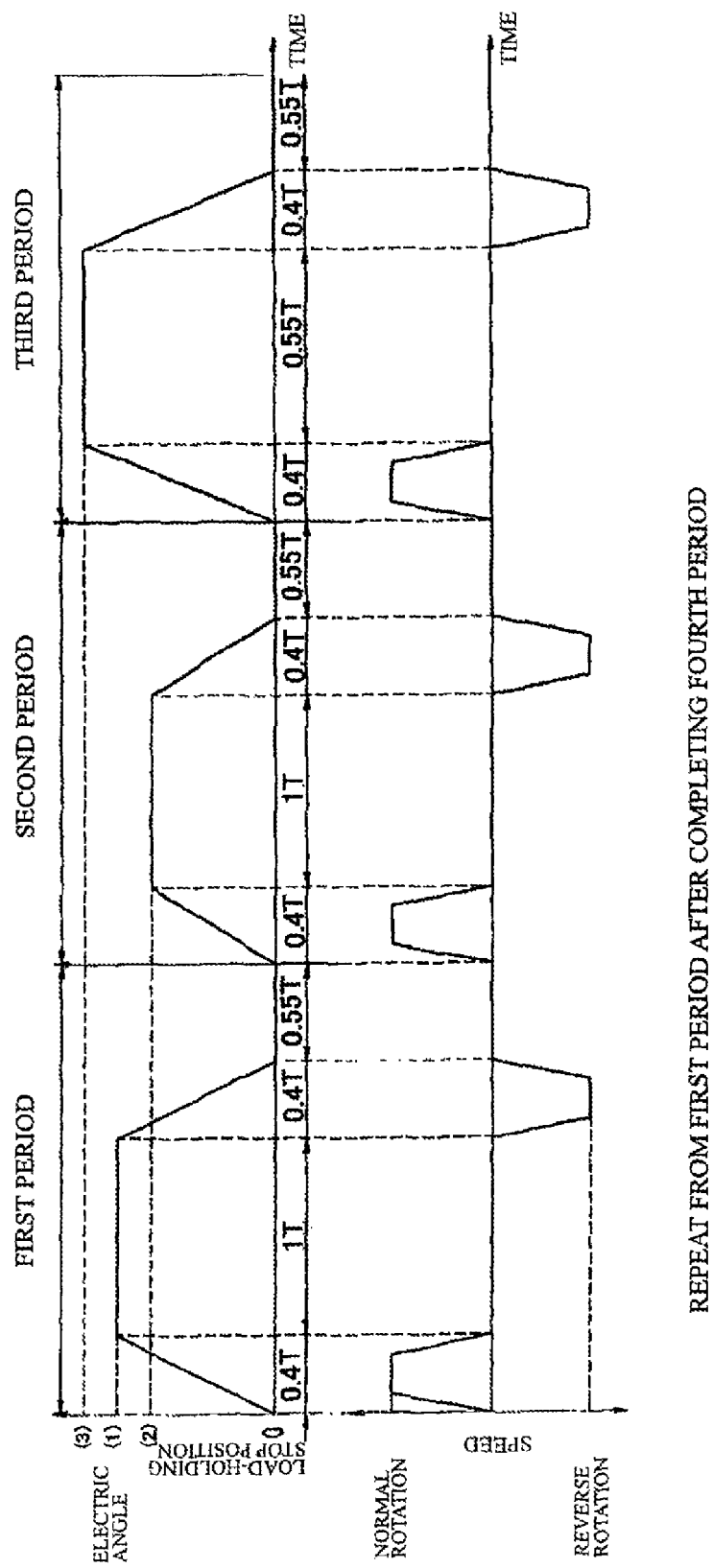
FIG. 2 is a timing chart showing a pattern of load-holding stop actions of the electric machinery.

FIG. 2 is a timing chart showing a pattern of time lengths of stopping the energization of the three-phase motor coils 3, at the load-holding stop positions (1)-(3), while performing one cycle of the rotor operation. The one cycle of the rotor operation is to rotate the rotor 2 from the given load-holding stop position (1) and stop the rotor 2 at the given load-holding stop position (1) again, after the rotor 2 is turned or rotated the prescribed angle. Of course, the one cycle of the rotor operation may be started and stopped at the load-holding stop position (2) or (3).

Pressing actions and return actions of the clutch pedal are repeated, so the rotor 2 is rotated in a normal direction when the clutch pedal is pressed. On the other hand, the rotor 2 is rotated in the reverse direction when the clutch pedal returns to an initial position. Periods 1-3 are the total time of one cycle of the rotor operation.

The load-holding stop positions are defined according to the electric angles (1)-(3). For example, electric angles (1)-(3) are separated with angular intervals of 60 degrees (electric angle). According to FIG. 2, six energization patterns of the three-phase motor are switched every time the rotor is turned an electric angle of 60 degrees. Firstly, the rotor is stopped at the first load-holding stop position (1), for a time length of 1 T, in a state where the coils of the U-phase are energized. Secondly, the rotor is stopped at the second load-holding stop position (2), for a time length of 1 T, in a state where the coils of the V-phase are energized. Further, the rotor is stopped at the third load-holding stop position (3), for a time length of 0.55 T, in a state where the coils of the W-phase are energized. The above described energization patterns are repeated.

FIG. 3 is a table showing number of the load-holding stop actions performed at the load-holding stop position of each of the phases while performing two cycles of the rotor operations. Number of the load-holding stop actions performed in each of the phases is constant, i.e., two times. Therefore, heat generation of the phase coils can be averaged.

Figure 4:
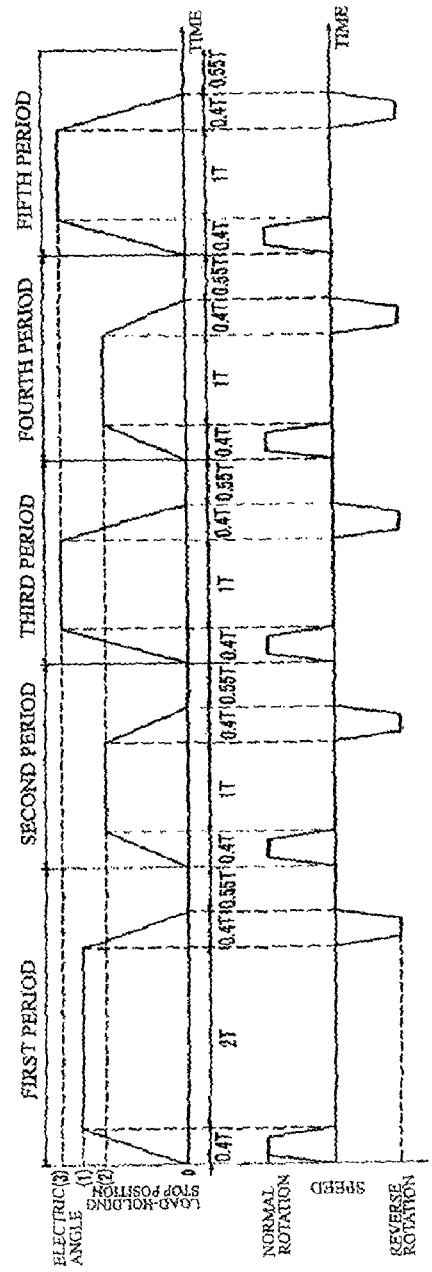
FIG. 4 is a timing chart showing a pattern of load-holding stop actions of another electric machinery.

FIG. 4 is a timing chart showing a pattern of time lengths of stopping the energization of the three-phase motor coils, at the load-holding stop positions (1)-(3), while performing one cycle of the rotor operation.

The pressing actions and return actions of the clutch pedal are repeated as well as the above described example. So, the rotor is rotated in the normal direction when the clutch pedal is pressed; the rotor is rotated in the reverse direction when the clutch pedal returns to the initial position.

The load-holding stop positions are defined according to the electric angles (1)-(3). For example, the electric angles are separated with the angular intervals of 60 degrees (electric angle). According to FIG. 4, firstly the rotor is stopped at the first load-holding stop position (1), for a time length of 2 T, in a state where the coils of the U-phase are energized. Secondly, the rotor is stopped at the second load-holding stop position (2), for a time length of 1 T, in a state where the coils of the V-phase are energized. Thirdly, the rotor is stopped at the third load-holding stop position (3), for a time length of 1 T, in a state where the coils of the W-phase are energized. Fourthly, the rotor is stopped at the second load-holding stop position (2), for a time length of 1 T, in the state where the coils of the V-phase are energized. Further, the rotor is stopped at the third load-holding stop position (3), for a time length of 1 T, in the state where the coils of the W-phase are energized. The above described energization patterns are repeated.

FIG. 5 is a table showing number of the load-holding stop actions performed at the load-holding stop position of each of the phases while performing one cycle of the rotor operation. Number of the load-holding stop actions performed in each of the phases is constant, i.e., two times. Therefore, heat generation of the phase coils can be averaged.

Actually, the clutch pedal is optionally operated by a driver. So, the rotor does not always stop at the electric angles (1)-(3), which respectively correspond to the given electric angles, for the same time length, with energizing the phase coils. However, in the present embodiment, if the time length for energizing the coils at the electric angle (1) is long, the rotor is turned to pass the electric angle (1) once, and then the time lengths for energizing the coils at other load-holding stop positions are increased. With this control, number of the load-holding stop actions performed in each of the phases is constant, i.e., two times. Therefore, heat generations of the phase coils can be averaged.

Figure 6:
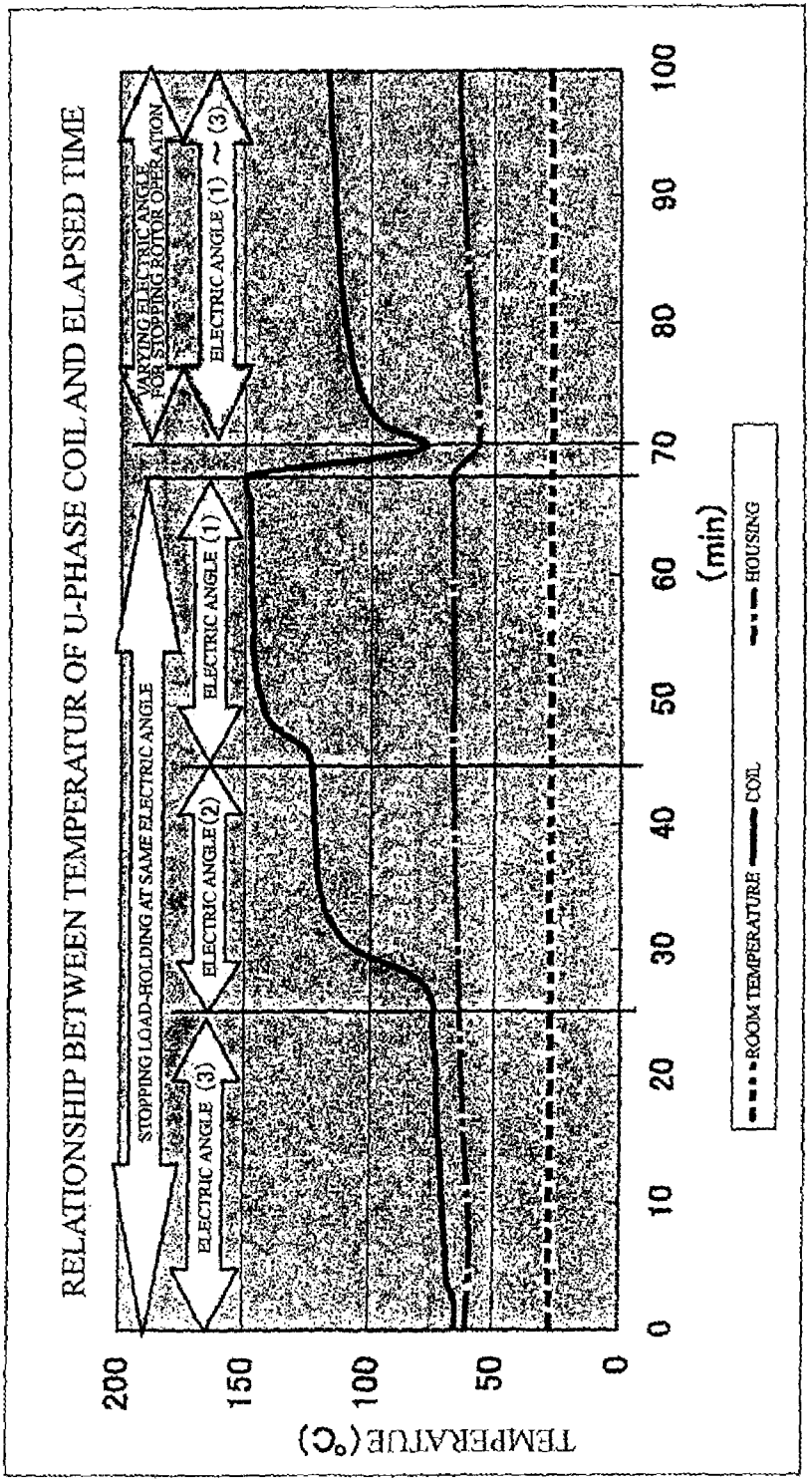
FIG. 6 is a graph showing temperature increase of U-phase coils.

Further, by increasing number of operating the clutch pedal, the number of stopping at the electric angles (1)-(3) is increased, so that heat generation of the phase coils can be stochastically averaged FIG. 6 is a graph showing results of a temperature increase test of the U-phase coils. A left half of the graph shows time-dependent temperature increase of the U-phase coils at the load-holding stop positions corresponding to the electric angles (1)-(3). In the test, the rotor was stopped at each of the load-holding stop positions until temperature increase was calmed down at some level, and then the rotor was turned until reaching the next load-holding stop position and stopped there in the load-holding state. The temperature increase of the U-phase coils became greater as time advanced. On the other hand, a right half of the graph shows an example relating to the present invention. No standard position was defined. The rotor was turned a prescribed angle, for a prescribed time, from a previous load-holding stop position and stopped at a new load-holding stop position. By changing the load-holding stop position, a total time length of energizing the phase coils was averaged, so that temperature increase of the U-phase coils could be restrained. Note that, in the test, the rotor was not turned by manual operation of the clutch pedal. The rotor was turned to the next load-holding stop position, for a predetermined time, by a program.

In the above described embodiment, the electric angles (1)-(3) are arbitrary angles, and the rotor may be stopped at any positions as far as rotating an electric angle of 180/n (n is number of phases and an integer two or more) degrees. The electric angles may be (1)'-(3)' as shown in FIG. 7.

Figure 7:
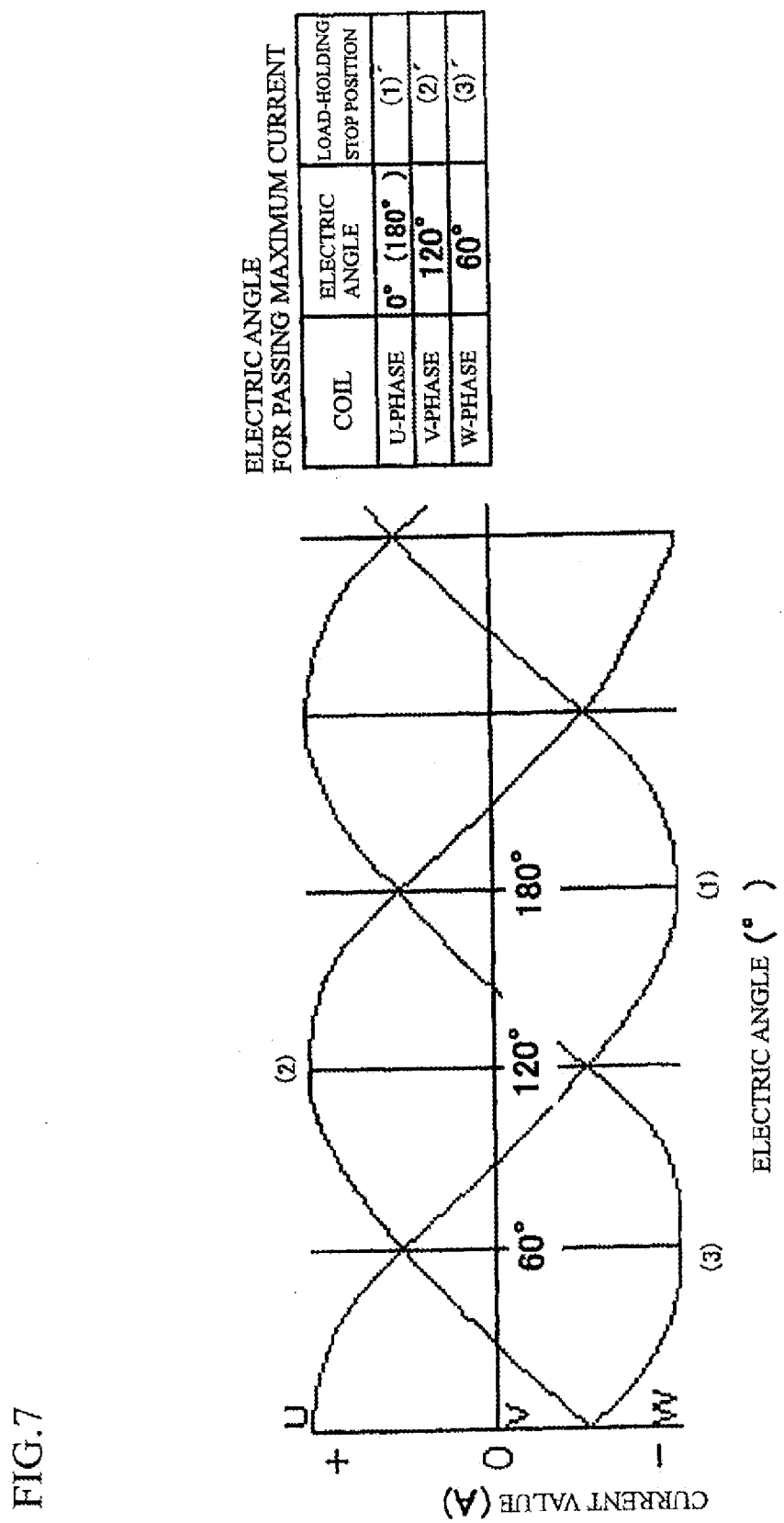
FIG. 7 is a graph showing a relationship between current waveforms of phase coils and electric angles.

FIG. 7 shows a relationship between maximum current of the three-phase coils and the electric angles. For example, the electric angle (1)' of the U-phase is 0 degrees, the electric angle (2)' of the V-phase is angularly shifted 120 degrees, and the electric angle (3)' of the W-phase is angularly shifted 60 degrees. The load-holding stop positions may be defined according to the electric angles (1)'-(3)', and they may be used in the above described controls explained with reference to FIGS. 2-5.

Figure 8:
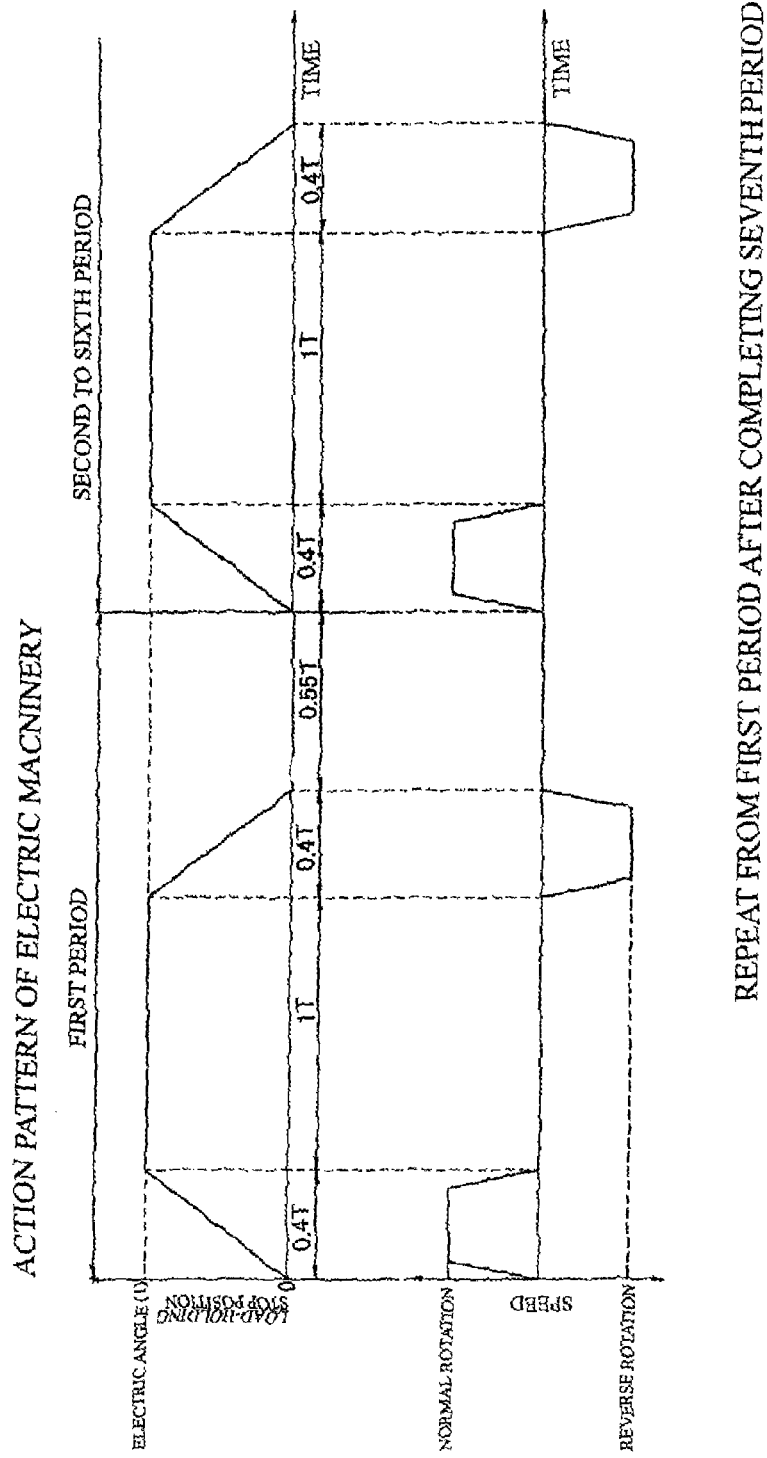
FIG. 8 is a timing chart showing a pattern of load-holding stop actions of a comparative example.
Figures 9, 10:
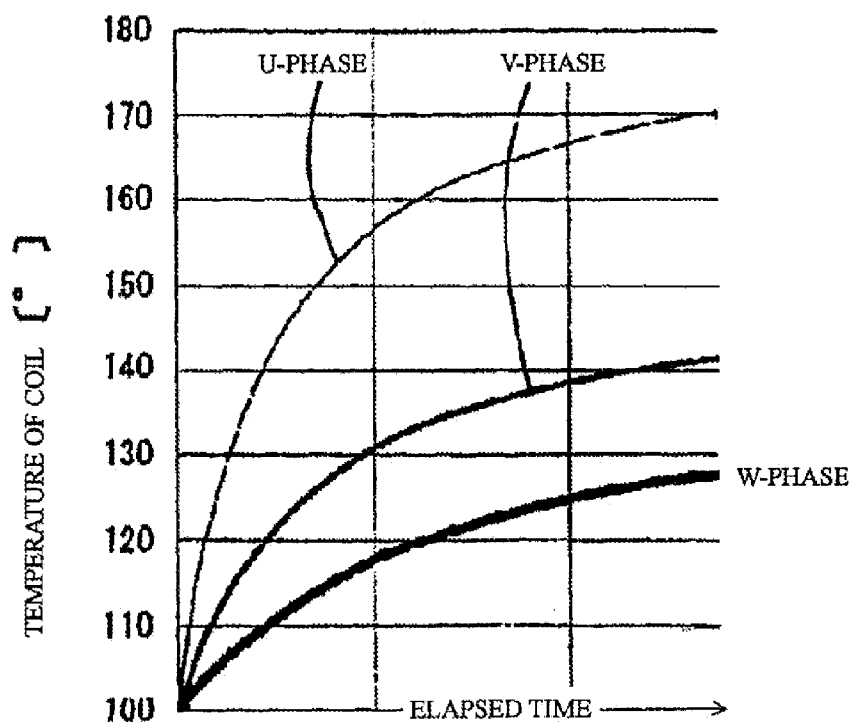
FIG. 9 is a table showing number of load-holding stop actions of the comparative example, in the load-holding state, at each electric angle.
FIG. 10 is a graph showing temperature increase at a specified load-holding position.

FIGS. 8-10 show a comparative example to the present invention. FIG. 10 shows time-dependent temperature variation of coils of each phase. The load-holding stop actions were performed in a specific phase.

FIG. 8 is a timing chart showing time lengths of stopping the rotor at the load-holding stop position (1), while performing six cycles of the rotor operations. The load-holding stop actions were performed in the U-phase.

According to FIG. 8, firstly the rotor was stopped at the load-holding stop position, for a time length of 1T, in a state where the coils of the U-phase were energized. And then, even coils of V-phase and W-phase were energized according to the rotational position of the rotor, the rotor was turned to and stopped at the load-holding stop position (1), at which the coils of the U-phase were energized. This pattern was repeated.

FIG. 9 is a table showing number of the load-holding stop actions performed at the load-holding stop position of the U-phase while performing six cycles of the rotor operations. In each of the six cycles having different energization patterns, the rotor was stopped at the load-holding stop position (1) of the U-phase every time, so number of the load-holding stop actions was six.

Therefore, the load-holding stop position was limited to the load-holding stop position (1) corresponding to the U-phase, so heat generation of the coils of the U-phase was greater than that of the coils of other phases.

In the present invention, the time lengths of energizing the phase coils and the energization patterns at the load-holding stop positions may be arbitrarily changed.

In the above described embodiment, the electric machinery is the three-phase motor, but the present invention may be applied to a two-phase motor, a four-phase motor, etc.

Further, the electric motor may be an inner rotor-type DC brushless motor or an outer rotor-type DC brushless motor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alternations could be made hereto without departing from the spirit and scope of the invention.

What is claimed is:

1. A method for drive-controlling electric machinery, in which a multiphase motor is used as a driving source of an assist mechanism, said method being performed by a control unit including a driving circuit for driving the multiphase motor, said method being characterized in, that the control unit controls to stop a rotor at a load-holding stop position, at which rotation of the rotor is stopped in a state where a motor coil is energized and the rotor is in a load-holding state, and that the load-holding stop position is angularly shifted an electric angle of 180/n degrees, in a prescribed rotational direction, with respect to a previous load-holding stop position of the rotor, where n is number of phases and an integer two or more.

2. The method according to claim 1, wherein one cycle of rotation of the rotor is defined as rotating the rotor from a given load-holding stop position and stopping the rotor at the given load-holding stop position after the rotor is rotated a prescribed angle, and a total time length of energizing the coil of each phase (U, V, W), while performing one cycle or a plurality of cycles of rotation of the rotor, is constant.

3. The method according to claim 1, wherein the load-holding stop position is a stop position of the rotor corresponding to a specific electric angle at which maximum electric current passes through the coil of any of phases (U, V, W).

4. The method according to claim 1, wherein the control unit controls the driving circuit on the basis of the position of the rotor, which is detected by a rotary sensor, with respect to a previous stop position of the motor, which is detected by a position sensor, so as to stop the motor at a position angularly shifted a prescribed angle with respect to the previous stop position.

* * * * *